Sept. 24, 1935.  S. F. ARMINGTON ET AL  2,015,331
WINDING GEAR
Filed Dec. 12, 1933    2 Sheets-Sheet 1

INVENTORS
STEWART F. ARMINGTON &
GEORGE E. ARMINGTON
BY
ATTORNEYS

Sept. 24, 1935.　　S. F. ARMINGTON ET AL　　2,015,331
WINDING GEAR
Filed Dec. 12, 1933　　2 Sheets-Sheet 2

INVENTORS
STEWART F. ARMINGTON &
BY GEORGE E. ARMINGTON
ATTORNEYS

Patented Sept. 24, 1935

2,015,331

UNITED STATES PATENT OFFICE 2,015,331

WINDING GEAR

Stewart F. Armington, Willoughby, and George E. Armington, South Euclid, Ohio, assignors to The Euclid Road Machinery Company, Euclid, Ohio, a corporation of Ohio Application December 12, 1933, Serial No. 702,018

16 Claims. (Cl. 298—35)

This invention relates to means for controlling the dumping of a vehicle. The general object of the invention is to provide retracting operation of dumping means, by power obtained from relative motion of a pair of vehicles, one of which is that having the dumping means, and which is hitched to the other vehicle.

Figure 1:
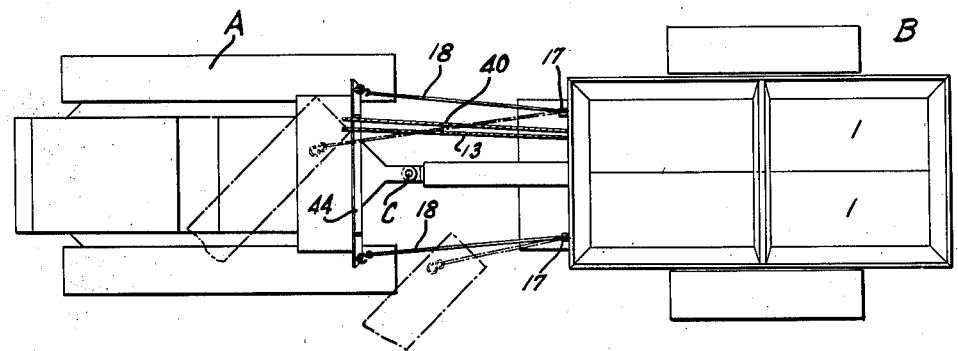
Figure 2:
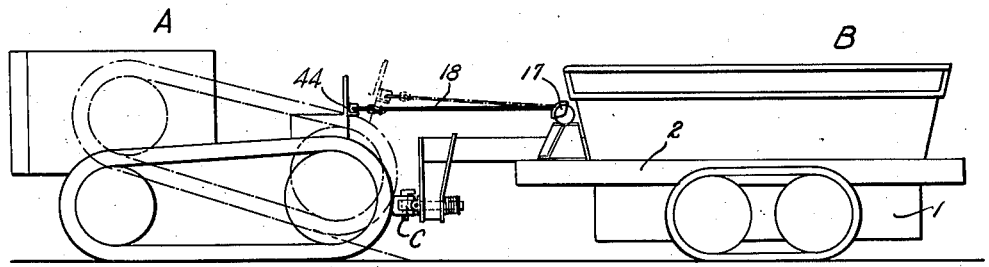
Figure 4:
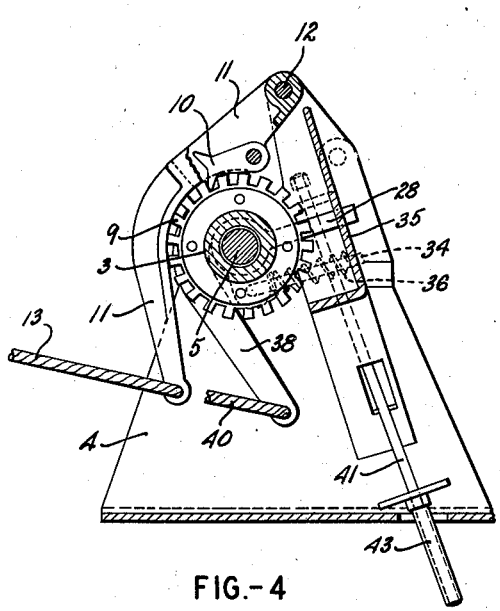
Figure 8:
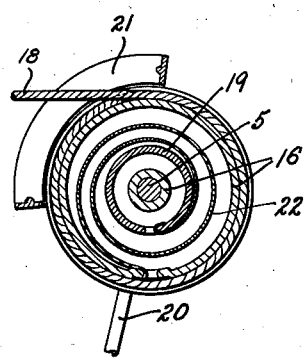
Figures 3, 5, 6, 7:
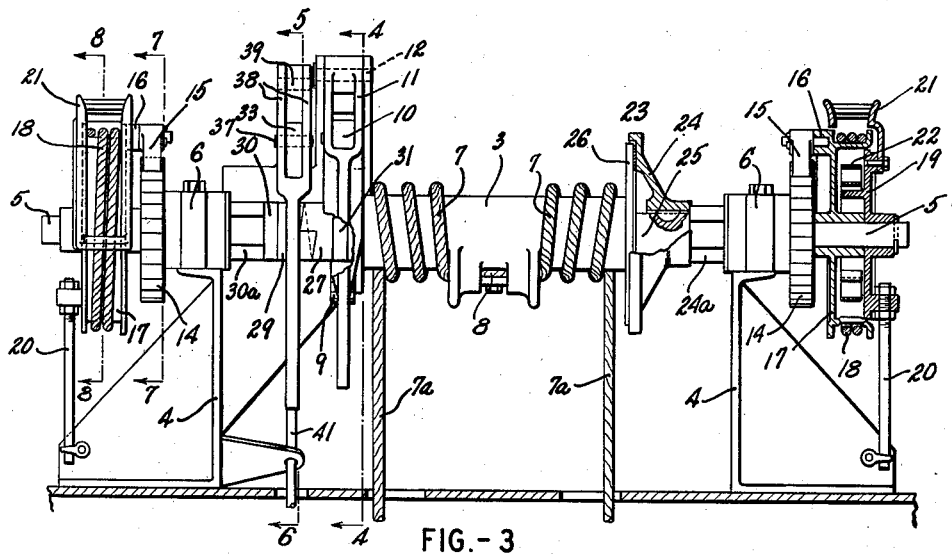

The exact nature of this invention, together with further objects and advantages thereof, will be apparent from the following description taken in connection with the accompanying drawings, in which Figs. 1 and 2 are conventionalized views in plan and elevation respectively, illustrating the operation and general arrangement of the invention, each showing a dumping trailer vehicle hitched to a tractor vehicle and indicating in broken lines relative angular motion between the vehicles; Fig. 3 is an assembly view in elevation, of parts of the operating gear for the dumping doors of the vehicle indicated in Figs. 1 and 2; Fig. 4 is a sectional elevation as in the plane of line 4—4, Fig. 3, and illustrating the holding means of the apparatus shown in Fig. 3; Fig. 5 is a sectional elevation as in the plane of line 5—6, Fig. 3, and illustrating the controlling means for the door-retracting mechanism, with the parts in door-closed position; Fig. 6 is a view similar to Fig. 5 but showing the parts in dumped position; Fig. 7 is a sectional detail as in the plane of line 7—7, Fig. 3, showing a part of the operating gear of the retracting mechanism; and Fig. 8 is a sectional detail as in the plane of line 8—8, Fig. 3, and showing details of the take-up mechanism for the retracting gear line.

With reference now to the drawings, A indicates a tractor vehicle and B a trailer vehicle hitched thereto as at C by a connection providing relative angular motion between the vehicles in any plane. The trailer vehicle B is a dumping vehicle and is here indicated as of the general type more fully illustrated and described in Patent No. 1,752,056, issued March 25, 1930, to A. P. Armington and S. F. Armington. It is sufficient here, that the trailer vehicle is arranged for gravity dumping by door means here shown as a pair of doors 1, 1, each arranged to swing about a side of the vehicle, between the closed position of Figs. 1 and 5, wherein the doors are horizontally disposed to close the bottom opening of the vehicle body, and an open position as indicated, Fig. 2, wherein each door is dependent from its side of the vehicle frame 2.

It will be obvious that the doors, if secured in closed position, will when released, dump by gravity, and after dumping the load the doors may be reclosed by suitable retracting means. Such door-controlling means comprises, primarily, an operator movably mounted relative to the stationary parts of the vehicle and here shown as including a drum 3 disposed at the forward end of the vehicle B extending thereacross and mounted upon the vehicle body as by a pair of brackets 4. In the arrangement shown the drum 3 is rotatably mounted upon a shaft 5 which in turn has bearings at 6 carried by the brackets 4. The drum 3 is connected with the doors 1 by a cable 7 having a bight secured with the drum as at 8 and a pair of leads 7a each connected to one of the doors 1. It will be apparent from the arrangement described that by rotation of the drum 3 counterclockwise in Figs. 2 and 4, both doors 1 may be raised to closed position, upon securement of the drum thereafter the doors may be secured in closed position, and upon release of the drum 3 the doors will open by gravity.

For releasable securement of the drum 3 in positions to which it may have had retracting operation, a ratchet wheel 9 is secured with the drum as at one end thereof, and a cooperative pawl 10 mounted on a lever 11 pivoted at 12 to any convenient fixed part on the vehicle. In Fig. 4 these parts are shown in their usual position, wherein the pawl 10 engages the ratchet 9, so that any counterclockwise position to which the drum may be actuated, will be maintained by the pawl 10 engaging the ratchet wheel 9, the disposition of the pawl providing that its we'ght will maintain the bearing against the ratchet wheel. It will be equally apparent that motion of the lever 11 to the left in Fig. 4, as by a pull upon the control line 13, will move the lever clockwise about its axis 12, raising the pivot point of the pawl 10 sufficiently that it may be turned under, counterclockwise upon the lever 11, releasing the ratchet wheel 9 and thus the drum 3; so that the doors 1 will be likewise released. Thereafter, upon release of the lever 11, followed by counterclockwise actuation of the drum and ratchet wheel, the pawl will be returned to its engaging position of Fig. 4.

For such actuation of the drum 3, to retract the dumping doors, means are provided for rotation of the shaft 5 on which the drum is rotatably mounted, and for clutching connection between the shaft and drum.

For actuation of the shaft 5, a pair of ratchet wheels 14 is secured thereon, one immediately outside of each bearing 6, and for each ratchet wheel a pawl 15 is arranged for cooperation therewith. Each pawl 15 is carried by a bracket 16 rotatably mounted upon the shaft 5 and having a drum face 17 concentric with the shaft 5 and adapted to receive a few turns of a line 18 secured to the bracket.

Cooperative with each rotatable bracket 16 is a fixed bracket 19, mounted on the shaft 5 to permit rotation of the shaft therein, and secured against rotation as by a connection 20 with the frame or other convenient stationary part of the vehicle. A guide 21 for the stretch of the line 18 leading from the drum face 17, may be provided on each fixed bracket 19. Interconnecting each rotational bracket 16 with its fixed bracket 19, is a spring 22 spirally arranged within the cavity formed between the two brackets as shown in Figs. 3 and 8 of the drawings. Each spring 22 has its ends connected one with each of its brackets and the arrangement is such that the spring yieldably urges the bracket 16 in a direction to take up slack in the line 18 and to move the pawl 15 in ratcheting direction.

It will be obvious that by the arrangement described, a pull upon either or both of the lines 18 will cause counterclockwise actuation of the shaft 5, Figs. 4–8, this being the direction of rotation for the winding drum 3 to close the dumping doors of the vehicle B. Similarly, upon release of either or both of the lines 18 the corresponding spring 22 will cause the slack in such line to be taken up.

To impart motion from the shaft 5 to the winding drum 3, a clutch 23 is provided having a driving member 24 secured upon an enlarged part 25 of the shaft 5 and backed by the nut 24a secured on the shaft and a cooperative driven clutch member 26 which may comprise one of the heads of the winding drum as shown. At the opposite end of the drum 3 a cam 27 is mounted upon the shaft 5 to permit rotation of the latter therein, and to permit relative longitudinal motion between the parts, the cam 27 having an arm 28 associated with a part of the bracket 4 as indicated in Fig. 4, to prevent its rotation. A thrust bearing 31 is arranged upon the shaft 5 to provide for thrust effective between the fixed cam 27 and the drum 3. A controlling cam 29 is loosely mounted upon the shaft 5 adjacent the cam 27.

The fixed cam 27 and the controlling cam 29 are provided with cooperative helical cam faces as indicated Fig. 3, whereby rotation of the controlling cam 29 will effect spreading apart, longitudinally of the shaft 5, of the two cams. A thrust bearing 30 is arranged to be effective between the cam 29 and the nut 30a secured on the shaft 5.

As shown Figs. 5 and 6, the controlling cam 29 is provided with a pair of arms 32 and 33 by which its adjustment about the shaft 5 may be controlled. The arm 32 is connected with a plunger 34 loosely fitting through an opening in a stationary part 35 of the vehicle, and a compression spring 36 arranged about the plunger 34 to be effective to yieldably urge the cam 29 in clockwise direction Figs. 5 and 6, this being the direction to relieve end thrust between the cams 27 and 29.

It will be apparent that adjustment of the cam 29 in the opposite direction, against the spring 36, will force the cam faces of the cams 27 and 29 against each other, to engage the clutch 23 and cause the drum 3 to rotate with the shaft 5. When the clutch is thus engaged, endwise forces will be confined between the two nuts 24a and 30a, so that the shaft 5 will be still freely rotatable in its bearings at 6.

The arm 33 of the clutch-controlling cam 29 is connected as at 37 with a forked lever 38 which in turn is connected by a link 39, with a fixed part of the vehicle. A line 40 is arranged to control the lever 38.

It will be apparent that when the parts are as indicated in Fig. 5, which is that wherein the clutch 3 is disengaged, a pull upon the line 40 will move the parts to the position of Fig. 6, against the spring 36, to cause engagement of the clutch. Such clutch engagement will be maintained, by the cooperation of the links 39 with the rear part of the lever 38 acting as a toggle. Thus a pull upon the line 40 will cause engagement of the clutch to start the winding operation of the drum 3, but does not provide for disengagement of the clutch to terminate the winding operation of the drum 3.

Means are provided for automatically declutching when the dumping means have been fully retracted from dumping position, that is, after the drum 3 has completed its winding operation. For this purpose a push rod 41 is slidably mounted as indiacted in Figs. 5 and 6, with one end engageable by a bracket 42 secured on one of the doors 1, and with the other end adapted to engage the link 39 to break the described toggle. The push rod may be made extensible as by an elongated bolt 43 for adjustment so that the toggle will be broken and the clutch 23 thus released just as the door attains fully closed position. It will be apparent from Figs. 5 and 6, that instantly the toggle is broken by raising of the push rod 41 by the door the cam 29 will be returned to original declutching position both by the weight of the lever 38 and the effect of the spring 36.

With reference now to Figs. 1 and 2, the lines 18 leading from the drum faces 17 of the winding gear are led forward from the trailer vehicle B and connected with the tractor vehicle A as to a bar 44 secured on the latter, the arrangement being such that the connections of the lines 18 with the tractor are widely separated laterally and at points substantially elevated above the point of hitch C between vehicles. The lines 13, leading from the dumping control lever 11, and 40, leading from the clutch-engaging lever 38, are led forwardly from the winding gear and connected to the tractor at any convenient point to be grasped by the tractor operator.

Beginning with the doors closed and there latched by engagement of the pawl 10 with the drum ratchet wheel 9, operation will be as follows. Travelling of the train of two vehicles will involve uneven occasional forward pulls upon the actuating lines 18. As the vehicles turn to the left, the right-hand line 18 will be pulled forwardly as indicated in Fig. 1, and obviously a right-hand turn would accomplish similar pull but upon the left-hand line 18. When relative motion between the hitched vehicles is in the vertical plane as in travelling over hill and dale, there will be a forward pull upon both lines 18 as indicated in Fig. 2. Slack in both lines 18 will always be taken up by the springs 22.

Obviously any relative motion between the two vehicles in any plane, will accomplish forward pulls upon one or both of the lines 18, and each forward motion of either of the lines will cause rotation of the shaft 5 in winding direction because of the pawls 15 and ratchet wheels 14.

The drum 3 being held stationary by its ratchet wheel 9, however, and the clutch 23 being disengaged—its controlling parts being as illustrated in Fig. 5—the dumping doors of the vehicle B remain closed and the intermittent motion of the shaft 5 does not affect the winding drum 3.

When it is desired that the load be dumped, the operator pulls upon the line 13 to release the pawl 10 from its hold on the ratchet wheel 9. This releases the drum 3 and permits the doors 1 to drop by gravity, thus dumping the load.

After the load has been dumped, the vehicles continuing to travel, to retract the dumping means, that is, return the doors to closed position, the operator simply pulls the control line 40 to raise the lever 38 from the position of Fig. 5 to that of Fig. 6, which position is maintained by the toggle effect already described. Such positioning of the parts engages the clutch 23 and imparts to the drum 3 in winding direction, the intermittent motion imparted to the shaft 5 through the lines 18 and ratchet wheels 14. The closing or retracting motion is irregular depending upon the motion between vehicles, but eventually the doors attain fully closed position. As such position is attained, the push rod 41 is raised from its position in Fig. 6 to that in Fig. 5, breaking the toggle and automatically releasing the clutch 23. During the retracting motion the doors are maintained in all positions to which they may have been retracted by winding operation of the drum 3, by engagement of the pawl 10 with the retaining ratchet wheel 9; so that when the clutch is released the doors remain latched closed, ready to be dumped by the operator.

It will be apparent that the rate of retracting of the dumping means may be adjusted by adjustment of the connection of the lines 18 with the bar 44; the farther out on this bar the connections are made, the more rapid will be the retracting operation for travel over the same path. Thus, on any job the retraction may be made as fast as necessary to complete the operation while the vehicles travel from dumping to loading position.

What we claim is:

1. In a trailer vehicle having dumping means and retracting means therefor, operating means for said retracting means and associatable with a draft vehicle to which said trailer vehicle may be hitched, to cause step by step operation of said retracting means dependent upon relative angular motion between said vehicles, said operating means having unidirectional driving connection with said retracting means for the purpose, operator-controlled means for initiating the effectiveness of said connection, to initiate the retracting operation, and means associated with said dumping means for terminating the effectiveness of said connection automatically dependent upon completion of the retracting operation.

2. In a trailer vehicle having dumping means and retracting means therefor, operating means for said retracting means and associatable with a draft vehicle to which said trailer vehicle may be hitched, to cause step by step operation of said retracting means dependent upon relative angular motion between said vehicles, clutch means arranged to control the drive of said retracting means by said operating means, operator-controlled means for causing engagement of said clutch means, and means associated with said dumping means for automatically disengaging said clutch means upon completion of the retracting operation.

3. In a trailer vehicle having a dumping door and retracting means therefor and including a winding drum, cable means connecting said drum and said door, and holding means for securing said drum in wound positions and releasable to permit dumping of said door, operating means for said retracting means and associatable with a draft vehicle to which said trailer vehicle may be hitched, to produce reciprocating motion dependent upon relative angular motion between said vehicles, and including means for converting said reciprocal motion into rotary motion, and a clutch for imparting said rotary motion to said drum, operator-controlled means for causing engagement of said clutch, and means associated with said door for causing disengagement of said clutch to follow closing of said door.

4. In a trailer vehicle having dumping means and retracting means therefor, operating means for said retracting means and associatable with a draft vehicle to which said trailer vehicle may be hitched, to cause step by step operation of said retracting means dependent upon relative angular motion between said vehicles, said operating means including releasable retaining means for said dumping means and a pair of laterally spaced mechanisms, each wholly at one side of said trailer vehicle and each adapted to impart retracting impulses to said retracting means dependent upon turning operation of the vehicles toward the other side.

5. In a trailer vehicle having a dumping door and retracting means therefor and including a winding drum, cable means connecting said drum and said door, and holding means for securing said drum in wound positions and releasable to permit dumping of said door, operating means for said retracting means and including a line associatable with a draft vehicle to which said trailer vehicle may be hitched, a connection from said line to said drum and including a ratchet and pawl device, a device for taking up slack in said line, and a clutch, operator-controlled means for causing engagement of said clutch, and means associated with said door for causing disengagement of said clutch.

6. In combination with a pair of road vehicles hitched together for travel as in a train, one of said vehicles having dumping door means with operating means therefor including a movably mounted part laterally removed from the hitch between said vehicles, and means connecting said part with said door means to permit the former to close the latter, and means for releasably securing said door means in closed position, means connecting said operating means with the other vehicle to provide door-closing actuation of said operating means dependent upon turning motion between said vehicles, and including means having driving connection with said movable part, and having driven connection with said other vehicle and being disposed to be effective upon one side of said hitch, substantially removed therefrom.

7. In combination with a pair of road vehicles hitched together for travel as in a train, one of said vehicles having dumping means with operating means therefor, said operating means including a rotatably mounted part, means connecting said part with said dumping means, an oscillatory part laterally removed from the hitch between said vehicles, means providing dumping-means-retracting drive from said oscillatory to said rotatable part, and releasable retaining means for said rotatable part, means connecting said oscillatory part with the other vehicle to cause step by step retracting actuation of said operating means dependent upon successive steering motions between said vehicles, and including means having connection with said oscillatory part, and with said other vehicle and being disposed upon one side of said hitch means.

8. In combination with a pair of road vehicles hitched together for travel as in a train, one of said vehicles having dumping means with operating means therefor, said operating means including a rotatably mounted part, means connecting said part with said dumping means, an oscillatory part laterally removed from the hitch between said vehicles, means providing disconnectible dumping-means-retracting drive from said oscillatory to said rotatable part, and releasable retaining means for said rotatable part, means connecting said oscillatory part with the other vehicle to cause step by step retracting actuation of said operating means dependent upon successive steering motions between said vehicles, and including tensile means having connection with said oscillatory part, and with said other vehicle and being disposed upon one side of said hitch means.

9. In combination with a pair of road vehicles hitched together for travel as in a train, one of said vehicles having dumping means with operating means therefor, said operating means including a rotatably mounted part, means connecting said part with said dumping means, an oscillatory part laterally removed from the hitch between said vehicles, means providing dumping-means-retracting drive from said oscillatory to said rotatable part, and releasable retaining means for said rotatable part, means connecting said oscillatory part with the other vehicle to cause step by step retracting actuation of said operating means dependent upon successive steering motions between said vehicles, and including means having connection with said oscillatory part, and with said other vehicle and being disposed wholly upon one side of said hitch means, and means for disconnecting said drive automatically dependent upon completion of the retracting operation.

10. In combination with a pair of road vehicles hitched together for travel as in a train, one of said vehicles having dumping means with operating means therefor including releasable retaining means for said dumping means and a pair of movably mounted parts laterally removed on opposite sides from the hitch between said vehicles, means connecting said operating means with the other vehicle to provide retracting actuation of said operating means dependent upon turning motion between said vehicle in either direction, and including a pair of tensile means each having a stretch between one of said movable parts and said other vehicle at a location from said hitch upon the same side as its movable part.

11. In combination with a pair of road vehicles hitched together for travel as in a train, one of said vehicles having dumping means with operating means therefor, said operating means including a rotatably mounted part, means connecting said part with said dumping means, a pair of oscillatory parts laterally removed on opposite sides from the hitch between said vehicles, means providing dumping-means-retracting drive from said oscillatory parts to said rotatable part, and releasable retaining means for said rotatable part, means connecting said oscillatory parts with the other vehicle to cause step by step retracting actuation of said operating means dependent upon steering motions in either direction between said vehicles, and including, for each oscillatory part, tensile means having connection therewith, and with said other vehicle at a location from said hitch means upon the same side.

12. A pair of road vehicles hitched together for travel as in a train, one of said vehicles having dumping door means with operating means therefor including a movably mounted part laterally removed from the hitch between said vehicles, means connecting said part with said door means to permit the former to close the latter, and means for releasably securing said door means in closed position, and means connecting said operating means with the other vehicle to provide door-closing actuation of said operating means dependent upon turning motion between said vehicles, and including means having driving connection with said movable part and having driven connection with said other vehicle at a point removed from said hitch on the same side as said movable part.

13. A pair of road vehicles hitched together for travel as in a train, one of said vehicles having dumping door means with operating means therefor including a movably mounted part laterally removed from the hitch between said vehicles, means connecting said part with said door means to permit the former to close the latter, and means for releasably securing said door means in closed position, and means connecting said operating means with the other vehicle to provide door-closing actuation of said operating means dependent upon turning motion between said vehicles, and including a tension member extending from said movable part to said other vehicle and having connection with the latter on the same side of said hitch.

14. In combination with dumping means of the class described, retracting means therefor, power means for said retracting means, and control means for said power means and comprising a pair of toggle members adjustable between operative and idle positions on opposite sides of straightened position, said members having associated means yieldably opposing their straightening, operator-operable means for adjusting said toggle members to said operating position to initiate the retracting operation by rendering said power means effective upon said dumping means, and trip means actuable by said dumping means for adjusting said members from said operative position past straightened position responsive to completion of the retracting operation to thereupon automatically terminate the said effectiveness of said power means.

15. In a vehicle having a dumping door and power means for closing said door, control means for said power means and including a pair of toggle members adjustable between a self-maintaining driving position slightly to one side of straightened position, and an idle position removed on the opposite side of straightened position, said members having associated means yieldably opposing their straightening, operator-operable means for adjusting said toggle members to said driving position, and trip means for adjusting said members from driving position past straightened position automatically responsive to closing of said door.

16. In a vehicle having a dumping door, cable means for closing said door, a drum for controlling said cable means, power means for winding drive of said drum, and clutch means for controlling said drum drive, control means for said clutch means and including a pair of toggle members adjustable between a self-maintaining driving position slightly to one side of straightened position and a broken idle position removed on the opposite side of straightened position, said members having associated means yieldably opposing their straightening, operator-operable means for adjusting said toggle members to said driving position to cause engagement of said clutch means to initiate said drive, and trip means for adjusting said members from driving position past straightened position responsive to closing of said door, to thereby automatically release said clutch means and terminate said drive.

STEWART F. ARMINGTON.
GEORGE E. ARMINGTON.